United States Patent [19]
Orr et al.

[11] 3,950,751
[45] Apr. 13, 1976

[54] CW INTERFERENCE CANCELLER (CWIC)

[75] Inventors: Roger D. Orr, China Lake; George H. Nitta, Pomona, both of Calif.

[73] Assignee: The United States of America as represented by the Secretary of the Navy, Washington, D.C.

[22] Filed: Dec. 18, 1969

[21] Appl. No.: 4,498

[52] U.S. Cl. .............................. 343/18 E; 343/7.7
[51] Int. Cl.² ........................................... G01S 7/36
[58] Field of Search ............... 343/5 AF, 7.7, 18 E

[56] References Cited
UNITED STATES PATENTS

| | | | |
|---|---|---|---|
| 2,852,669 | 9/1958 | Ashby | 343/5 AF |
| 3,159,835 | 12/1964 | Gore | 345/5 AF |
| 3,417,396 | 12/1968 | Stifter et al. | 343/7.7 |

*Primary Examiner*—Malcolm F. Hubler
*Attorney, Agent, or Firm*—R. S. Sciascia; G. J. Rubens; T. M. Phillips

[57] ABSTRACT

An antijam device for use in radar and missile guidance systems which tracks a doppler-shifted CW target echo by means of an automatic frequency control loop. Means are placed between the doppler filter and error detector portion of the automatic frequency loop to suppress the interference signal and generate an output signal which is essentially identical in frequency and amplitude to the target doppler signal which is tracked instead of the jamming signal.

2 Claims, 2 Drawing Figures

ROGER D. ORR
GEORGE H. NITTA
INVENTORS

CW INTERFERENCE CANCELLER (CWIC)

STATEMENT OF GOVERNMENT INTEREST

The invention herein described may be manufactured and used by or for the Government of the United States of America for governmental purposes without payment of any royalties thereon or therefor.

BACKGROUND OF THE INVENTION

The present invention relates to doppler tracking systems and more particularly, to doppler tracking systems where interference signals are suppressed and a signal for tracking is generated.

Heretofore, doppler tracking systems have been highly susceptible to velocity deception jamming. Velocity deception jammers (sometimes called velocity-gate stealers) intercept the transmitted radar signal, introduce a frequency shift, and retransmit it at a very high power level. Initially the frequency shift is small so that the jamming signal enters the passband of the doppler filter of the victim radar and captures its doppler-tracking AFC loop. Then the frequency shift is increased and, since the AFC loop is now tracking the stronger jamming signal, it is pulled away from the target doppler signal. After sufficient separation is achieved, the jamming signal is turned off or its program is recycled, so that the AFC loop no longer has a signal to track. It must then attempt to reacquire the target doppler signal. It may fail to do so, or it may lock onto another deception signal transmitted by the jammer.

Various attempts have been made to counter velocity jamming. For example, sensing the presence of the jamming signals and opening the AFC loop for as long as the jamming signal is in the doppler filter passband; limiting the tracking capability of the AFC loop so that it will not follow jamming signals that are rapidly changing frequency; and providing information to the AFC loop from an external source to assist in maintaining lock on the target doppler signal. The first example has the disadvantage that the doppler signal from a maneuvering target can leave the doppler filter passband while the AFC loop is open. The second example essentially defeats the purpose of the AFC loop in that it will not be able to track highly maneuverable targets and could still track jamming signals that are of slowly changing frequency. The third example has the serious disadvantage of requiring a second radar.

SUMMARY OF THE INVENTION

The present invention provides a system which overcomes the disadvantages of prior known systems by detecting the presence of CW interference signals and generating a target signal which permits the AFC loop to track without a loss of capability when a weaker target doppler signal is in the presence of strong CW interference.

STATEMENT OF THE OBJECTS OF THE INVENTION

An object of the invention is to provide an AFC loop doppler tracking system with the capability of tracking without being degraded when strong CW interference is present.

Another object of the invention is to provide an AFC loop doppler tracking system that requires no target information provided by means external to the tracking system, And still another object is to provide a tracking system which generates a filtered target signal in which CW jamming in the doppler filter passband has been essentially eliminated.

Other objects and many of the attendant advantages of this invention will become readily appreciated as the same becomes better understood by reference to the following detailed description when considered in connection with the accompanying drawings wherein:

DESCRIPTION OF THE PREFERRED EMBODIMENT

Figure 1:
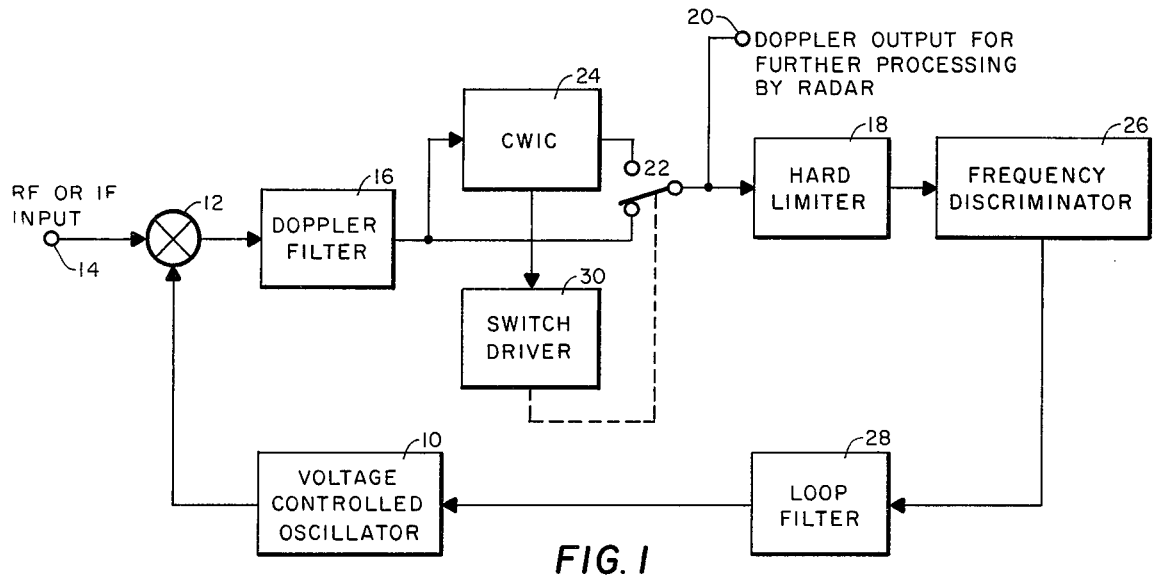
FIG. 1 is a block diagram of a conventional frequency-lock AFC loop used for doppler tracking modified in accordance with the teaching of the invention.

Referring to FIG. 1, there is shown in block diagram form a doppler signal tracking loop including a voltage controlled oscillator 10 providing an output which is fed to mixer 12. Also fed to mixer 12 is the RF or IF target signal which appears at input terminal 14. The output of mixer 12 is fed to doppler filter 16 which provides an output to hard limiter 18 and output terminal 20 through switch 22 and to CW interference canceller 24. The output of hard limiter 18 is fed to frequency discriminator 26 which provides a control voltage to oscillator 10 through loop filter 28. One output of CWIC 24 is fed to switch driver 30 for controlling the position of switch 22. When there is no jamming signal (known as speed-gate stealer) present, switch 22 connects the output of doppler filter 16 directly to hard limiter 18. When there is a speedgate-stealer jamming present in the passband of doppler filter 16, it is sensed by CWIC 24 and a control signal is fed to switch driver 30 to move switch 22 to disconnect doppler filter 16 from hard limited 18 and to connect CWIC 24 in service between doppler filter 16 and hard limiter 18. CWIC 24 provides an output signal that is free of the jamming signal and a signal that is a near replica of the target doppler signal in manner described below.

Figure 2:
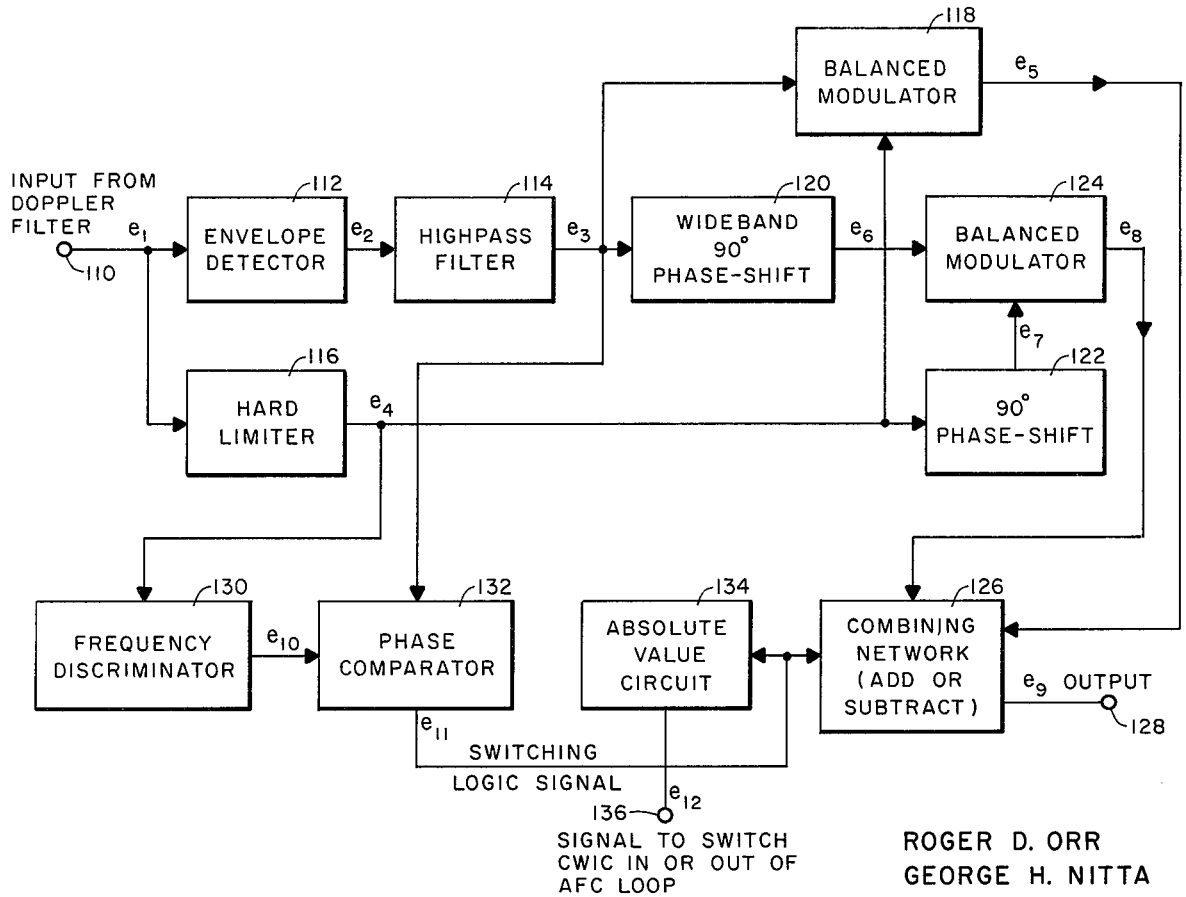
FIG. 2 is a block diagram of the interference signal detector and target signal generator for incorporation in the tracking system of FIG. 1.

Referring now to FIG. 2, the operation of CWIC 24 will be described by showing that: the primary output is a near replica of the weaker of two sinusoidal input signals; a switching signal is generated to configure a combining network so that it adds or subtracts as required depending on the order of the two input frequencies; and CWIC 24 is switched into or out of the AFC loop as appropriate depending on the presence or absence of the jamming signal.

Let the weaker desired signal be represented by $S \cos \omega_s t$ and the stronger interfering signal be represented by $J \cos (\omega_J t + \theta)$, where $S$ and $J$ are constants such that $S << J$, $\theta$ is an arbitrary constant, and $\omega_S$ and $\omega_J$ are the frequencies of the two signals (in radians per second). It is assumed that $\omega_S$ and $\omega_J$ are within the passband of doppler filter 16 in FIG. 1 but that they are not precisely equal. The input at terminal 110 to envelope detector 112 of FIG. 2 is thus $$e_1 = S\cos\omega_s t + J\cos(\omega_J t + \theta). \tag{1}$$

To simplify notation, let $$x = \omega_s t$$

$$y = \omega_J t + \theta.$$

Then, using trigonometric indentities, $e_1$ can be written $$e_1 = S\cos x + J\cos y, \qquad (2)$$

$$= \sqrt{J^2 + S^2 + 2SJ\cos(x-y)} \cos(y + \psi). \qquad (3)$$

where $$\psi = \tan^{-1}(S\sin(x-y)/J + S\cos(x-y)).$$

With $S \ll J$, $$\frac{\sqrt{J^2+S^2+2SJ\cos(x-y)}}{\cos(x-y)} = \sqrt{J^2+S^2}\sqrt{1+2SJ/J^2+S^2}$$
$$\cos(x-y), \approx \sqrt{J^2+S^2}\,[1+(SJ/J^2+S^2)\cos(x-y)], \qquad (4)$$

$$\approx \sqrt{J^2+S^2}\,[1 + S/J\cos(x-y)], \qquad (5)$$

$$\tan^{-1}(S\sin(x-y)/J+S\cos(x-y)) \approx S/J\sin(x-y).$$

Thus, $$e_1 \approx \sqrt{J^2+S^2}\,[1+S/J\cos(x-y)]\cos[y+S/J\sin(x-y)]. \qquad (6)$$

Assuming $|\dot x - \dot y| \ll \dot y$, (that is, assuming $|\omega_S - \omega_J| \ll \omega_J$), the signal $e_1$ will then have amplitude modulation $S/J\cos(x-y)$, and phase modulation, $S/J\sin(x-y)$.

The output of $e_2$ of envelope detector 112 is proportional to the envelope of the input $e_1$:

$$e_2 = k_1\sqrt{J^2+S^2}\,[1+S/J\cos(x-y)], = k_1(\sqrt{J^2+S^2} + J\sqrt{1+(S/J)^2}\,(S/J\cos(x-y))], \approx k_1[\sqrt{J^2+S^2} + S\cos(x-y)]. \qquad (7)$$

High pass filter 112 should be designed to reject the dc term in Eg. 7, without introducing appreciable phase shift, so that its output $e_3$ is proportional to the sinusoidal component of $e_2$:

$$e_3 = k_2 k_1 S\cos(x-y). \qquad (8)$$

Hard limited 116 removes the amplitude modulation on $e_1$. Its output is $$e_4 = k_3\cos[y+S/J\sin(x-y)]. \qquad (9)$$

The signals $e_3$ and $e_4$ are applied to balanced modulator 118, the output of which is proportional to the product:

$$e_5 = k_4 e_3 e_4, = (k_4 k_3 k_2 k_1)S\cos(x-y)\cos[y+S/J\sin(x-y)]. \qquad (10)$$

Also, the signals $e_3$ and $e_4$ are shifted by 90°, $e_3$ by wideband 90° phase shifter 120 and $e_4$ by 90° phase shifter 122. The outputs are, respectively, $$e_6 = k_2 k_1 S \begin{cases} \sin(x-y), & \text{if } \omega_S \geq \omega_J \\ -\sin(x-y), & \text{if } \omega_S \leq \omega_J \end{cases} \qquad (11)$$

$$e_7 = k_3\sin[y+S/J\sin(x-y)]. \qquad (12)$$

(To understand why there are two cases to consider in equation 11, note that $$x-y = (\omega_s - \omega_J)t - \theta. \qquad (13)$$

Suppose, for example, that $\theta = 0$. Then whether $\omega_S > \omega_J$ or $\omega_S < \omega_J$, the input $\cos[(\omega_S-\omega_J)t]$ is the same signal so long as $|\omega_S-\omega_J|$ is the same. Thus, the output of phase-shifter 122 must be the same signal in both cases. For example, suppose first $$\omega_s = 10$$

$$\omega_J = 5$$

$$\theta = 0.$$

Then from equation 13, $x-y = 5t$ and $\cos(x-y) = \cos 5t$. Let the output of the phase-shifter with this input be $\sin 5t$. Now suppose $$\omega_s = 10$$

$$\omega_J = 15$$

$$\theta = 0.$$

Then $x-y = -5t$ and $$\cos(x-y)=\cos(-5t)=\cos 5t.$$

The phase-shifter has the same input as before. Thus the output must again be $\sin 5t$. But, in the first case its representation is $$\sin 5t = \sin (x-y),$$

whereas in the second case its representation is $$\sin 5t = \sin [-(x-y)] = -\sin (x-y).$$

The outputs, $e_6$ and $e_7$, of the 90° phase-shifters 120 and 122, respectively, are applied to balanced modulator 124. The signal out of balanced modulator 124 is then $$e_8 = k_4 e_6 e_7 = (k_4 k_3 k_2 k_1)S\sin(x-y)\sin[y+S/J\sin(x-y)],$$
$$\omega_S \geq \omega_J \quad -(k_4 k_3 k_2 k_1)S\sin(x-y)\sin[y+S/J\sin(x-y)],$$
$$\omega_S \geq \omega_J. \qquad (14)$$

By using the trigonometric identity $$\cos A \cos B - \sin A \sin B = \cos (A + B). \qquad (15)$$

we have $$\cos(x-y)\cos[y+S/J\sin(x-y)]-\sin(x-y)\sin[y+S/J\sin(x-y)] = \cos[x+S/J\sin(x-y)]. \qquad (16)$$

From Eqs. 10, 14, and 16, $$(k_4 k_3 k_2 k_1)S\cos[x+S/J\sin(x-y)] = \begin{cases} e_5-e_8, & \text{if } \omega_S \geq \omega_J \\ e_5+e_8, & \text{if } \omega_S \geq \omega_J \end{cases} \qquad (17)$$

Thus, if the parameters are set so that $$k_4 k_3 k_2 k_1 = 1,$$

and if combining network 126 sums the balanced modulator outputs $e_5$ and $e_8$ when $\omega_S < \omega_J$ and takes their difference when $\omega_S > \omega_J$, then the output of the combining network is $$e_9 = S\cos[x+S/J\sin(x-y)], = S\cos[\omega_S t+S/J\sin[\omega_S-\omega_J)t-\theta]. \qquad (18)$$

Signal $e_9$ which appears at terminal 128 is one of the outputs of CWIC (FIG. 1, terminal 22) and has the same amplitude as the weaker component of the CWIC input $e_1$. It also has the same frequency $\omega_S$ except for a small amount of frequency modulation.

The spectrum of $e_9$ consists essentially of a line at frequency $\omega_S$ and two small sideband lines at frequencies $\omega_S \pm (\omega_S - \omega_J)$. That is, $$e_9 = S\cos[x + S/J\sin(x-y)], \quad (19)$$

$$= S\{\cos \times \cos[S/J\sin(x-y)] - \sin \times \sin[S/J\sin(x-y)]\}, \quad (20)$$

where, since $S \ll J$, we have $$\cos[S/J\sin(x-y)] \approx 1 \quad \sin[S/J\sin(x-y)] \approx S/J\sin(x-y), \quad (21)$$

so that $$e_9 \approx S[\cos x - S/J\sin \times \sin(x-y)], \quad (22)$$

$$= S\cos x + S^2/2J\cos(2x-y) - S^2/2J\cos y, \quad (23)$$

$$= S\cos\omega_S t + S^2/2J\cos[(2\omega_S - \omega_J)t - \theta] - S^2/2J\cos(\omega_J t + \theta). \quad (24)$$

Thus, the output spectrum consists essentially of a desired component at frequency $\omega_S$, plus two undesired components, one at frequency $2\omega_S - \omega_J$, and one at frequency $\omega_J$. With $S \ll J$, the amplitude of the desired component will be much greater than the amplitudes of the undesired components.

In the above derivation, it has been assumed that the combining network 126 either adds or subtracts the balanced modulator outputs $e_5$ and $e_8$ according to whether $\omega_S$, the frequency of the smaller, desired signal, is less than or greater than $\omega_J$, the frequency of the larger signal. The relative magnitudes of the frequencies $\omega_S$ and $\omega_J$ are determined by means of frequency discriminator 130 and phase comparator 132.

The input to frequency discriminator 130 is $e_4$, which by equation 9, is $$e_4 = k_3\cos[y + S/J\sin(x-y)]. \quad (25)$$

The output of $e_{10}$ of frequency discriminator 130 is proportional to the deviation of the instantaneous frequency of $e_4$ from the center frequency of discriminator 130. That is, $$e_{10} = k_6[\omega_0 - \dot{y} - S/J(\dot{x} - \dot{y})\cos(x-y)], \quad (26)$$

$$= k_6(\omega_0 - \omega_J) - S/J(\omega_S - \omega_J)\cos[(\omega_S - \omega_J)t - \theta], \quad (27)$$

where $\omega_0$ is the center frequency of the discriminator 130. It is assumed that the dc component of $e_{10}$ is eliminated so that $$e_{10} = k \, S/6J(\omega_J - \omega_S)\cos[(\omega_S - \omega_J)t - \theta]. \quad (28)$$

This signal is then compared in phase comparator 132 with signal $e_3$, which by equation 8, is $$e_3 = k_2k_1S\cos(x-y), \quad (29)$$

$$= k_2k_1S\cos[(\omega_S - \omega_J)t - \theta]. \quad (30)$$

In phase comparator 132, the inputs $e_3$ and $e_{10}$ are hard limited into constant amplitude square waves and then multiplied and filtered to produce a dc output proportional to the sign of $(\omega_J - \omega_S)$:

$$e_{11} = k_7 \begin{cases} +1, & \text{if } \omega_J > \omega_S \\ 0, & \text{if } \omega_J = \omega_S \\ -1, & \text{if } \omega_J < \omega_S \end{cases} . \quad (31)$$

The switching logic signal $e_{11}$ is thus a positive voltage when $\omega_J > \omega_S$ and a negative voltage when $\omega_J < \omega_S$. The signal $e_{11}$ controls a switch in the combining network 126 that configures it into the required add or subtract mode.

The switching logic signal $e_{11}$ is zero only when $\omega_S = \omega_J$, that is, when there is only one frequency component at the input to CWIC 24. The output of the absolute value circuit 134, $$e_{12} = |e_{11}| = k_7 \begin{cases} +1, & \text{if } \omega_J \neq \omega_S \\ 0, & \text{if } \omega_J = \omega_S \end{cases} , \quad (32)$$

appears at output terminal 136 and is used to activate switch driver 30 in FIG. 1 to bring CWIC 24 into the AFC loop when two frequency components appear at input terminal 110.

We claim:
1. In an AFC loop tracking system in the presence of interference signals, the combination comprising:
   a. input terminal means,
   b. mixer circuit means coupled to said input terminal means producing output doppler signal,
   c. filter circuit means coupled to said mixer circuit means for passing signals within a predetermined frequency range,
   d. a switch having a first position for coupling the output of said filter circuit means to an output terminal and to the feedback loop controlling said mixer circuit means and having a second position,
   e. interference signal detecting circuit means coupled to said filter circuit means and being responsive to the presence of a false target doppler signal to switch said switch to said second position and to generate a near replica of the true target doppler signal.
2. The system of claim 1 wherein said interference signal detecting circuit means comprises:
   a. envelope detector means coupled to said filter circuit means for producing an output signal proportional to the envelope of signal received from said filter circuit means,
   b. highpass filter means for filtering the dc from the output of said envelope detector means,
   c. hard limiter means coupled to said filter circuit means for removing the amplitude modulation from the signal passed by said filter circuit means,
   d. a first balanced modulator coupled to said highpass filter and to said hard limiter for producing an output signal that is a product of the two input signals,
   e. a second balanced modulator having a first input coupled to said highpass filter through a wideband 90° phase shifter and a second input coupled to said hard limiter through a 90° phase-shifter for producing an output signal that is a product of its two inputs,
   f. combining network means coupled to said first and second balanced modulators for producing an output signal which is the near replica of the target doppler signal.

* * * * *

UNITED STATES PATENT OFFICE
CERTIFICATE OF CORRECTION

PATENT NO. : 3,950,751
DATED : 13 April 1976
INVENTOR(S) : Roger D. Orr, George H. Nitta It is certified that error appears in the above-identified patent and that said Letters Patent are hereby corrected as shown below:

Column 4, line 37, ">" should read --$\leq$--;
Column 4, line 51, "$\geq$" should read --$\leq$--.

Signed and Sealed this

Third Day of August 1976

[SEAL]

Attest:

RUTH C. MASON
Attesting Officer

C. MARSHALL DANN
Commissioner of Patents and Trademarks